(12) United States Patent
Rigal et al.

(10) Patent No.: US 9,188,977 B2
(45) Date of Patent: Nov. 17, 2015

(54) METHODS AND DEVICES FOR MANAGING MAINTENANCE INFORMATION IN AN AIRCRAFT

(75) Inventors: Frederique Rigal, Toulouse (FR); Jose Dekneudt, Montberon (FR)

(73) Assignee: Airbus Operations (SAS), Toulouse (FR)

( * ) Notice: Subject to any disclaimer, the term of this patent is extended or adjusted under 35 U.S.C. 154(b) by 1056 days.

(21) Appl. No.: 12/565,465

(22) Filed: Sep. 23, 2009

(65) Prior Publication Data
US 2010/0077046 A1 Mar. 25, 2010

(30) Foreign Application Priority Data
Sep. 23, 2008 (FR) ...................................... 08 56396

(51) Int. Cl.
| | |
|---|---|
| *G05B 23/02* | (2006.01) |
| *G06N 7/00* | (2006.01) |
| *B64F 5/00* | (2006.01) |

(52) U.S. Cl.
CPC ........ *G05B 23/0283* (2013.01); *G05B 23/0267* (2013.01); *B64F 5/0045* (2013.01); *G06N 7/00* (2013.01)

(58) Field of Classification Search
CPC .............. G06F 11/0739; B64F 5/0045; G05B 23/0267; G05B 2/0262; G06N 7/00
See application file for complete search history.

(56) References Cited

U.S. PATENT DOCUMENTS

| | | | |
|---|---|---|---|
| 4,943,919 A * | 7/1990 | Aslin et al. .................... | 701/3 |
| 5,161,158 A | 11/1992 | Chakravarty et al. | |
| 6,757,668 B1 | 6/2004 | Goebel et al. | |
| 7,437,225 B1 * | 10/2008 | Rathinam ...................... | 701/14 |
| 2003/0167111 A1 * | 9/2003 | Kipersztok et al. ............ | 701/29 |
| 2007/0033277 A1 * | 2/2007 | Yukawa et al. ................ | 709/224 |
| 2007/0288414 A1 | 12/2007 | Barajas et al. | |
| 2008/0056554 A1 * | 3/2008 | Ozawa ........................... | 382/139 |
| 2008/0147740 A1 | 6/2008 | Bailly et al. | |

* cited by examiner

*Primary Examiner* — Joe Chacko
(74) *Attorney, Agent, or Firm* — Oblon, McClelland, Maier & Neustadt, L.L.P.

(57) ABSTRACT

A method and a device for management of maintenance information items in an aircraft comprising a centralized maintenance system is disclosed. After a maintenance message has been received, the value of an impact attribute associated with the message received is determined according to predetermined configuration data. In response to the message received and to the value of the impact attribute associated with the at least one message received, the message received is processed. A determination of configuration data for the management of maintenance information items in an aircraft is also explained.

18 Claims, 3 Drawing Sheets

METHODS AND DEVICES FOR MANAGING MAINTENANCE INFORMATION IN AN AIRCRAFT

BACKGROUND OF THE INVENTION

1. Field of the Invention

This invention relates to maintenance operations for aircraft and more particularly methods and devices for management of maintenance information items adapted for determining a level of priority for breakdowns having an economic impact on the operation of the aircraft in order to transmit certain of these information items during flights and to indicate them in specific manner in the maintenance report for the flights.

2. Discussion of the Background

The main criteria for management of breakdowns in aircraft generally are linked to the safety of operation thereof. Breakdowns having an impact on the safety of operation of an aircraft are presented systematically to the pilots, preferably via the cockpit warning system. The pilots then report these warnings in their end-of-flight report, called logbook in English terminology, by the creation of an entry in this report, also called logbook entry. At the same time, one or more maintenance messages are generated automatically and stored in memory in the maintenance report for the flight. Such messages have the purpose of indicating as precisely as possible the origin of the failures having led to the warnings presented to the pilots.

At the stopovers, a maintenance team consults the logbook entries to which it absolutely must respond exhaustively prior to the next takeoff. For these purposes, it relies on the maintenance report for the flight which gives it information on the actions to be taken in order to repair the breakdown or breakdowns.

SUMMARY OF THE INVENTION

However, when a breakdown does not affect the safety of the flight, it generally is not indicated to the pilots via the cockpit warning system and, in this case, it is not reported in the logbook. Consequently, the maintenance team has no special obligation to process it. Moreover, the mechanics may not become aware of it if the maintenance report is not consulted apart from what strictly concerns the breakdowns reported by the crew.

There also are mechanisms making it possible to anticipate the maintenance actions. According to these mechanisms, the maintenance messages are transmitted in real time during flight. However, in order to limit the volume and the cost of in-flight transmissions, they generally are limited to problems that can affect safety.

Furthermore, as the air transport market is becoming more and more competitive, a growing number of airline companies wish to optimize their maintenance operations, not only as regards breakdowns affecting safety, but also breakdowns that can have significant economic impacts. Such breakdowns include, in particular, the following breakdowns, breakdowns linked to the maintenance systems that can cause significant delays leading to direct costs such as monetary compensations for passengers and airport taxes and an impairment of the public image of the airline company. For example, if the centralized maintenance system is not functioning, it is much more time-consuming and difficult to identify the origin of the malfunctions reported by the crew and to provide a response thereto enabling the aircraft to carry out its next mission or missions. Likewise, if the data downloading system is inoperative, it takes longer to replace a broken-down computer because it is necessary to find a replacement computer already loaded with the required software modules or to perform loading thereof in the shop; and breakdowns linked to the comfort of the passengers. This type of breakdowns affects in particular the airline companies whose commercial strategy is based on the quality of the services offered to the customers. By way of illustration, the unavailability of the system called IFE (acronym for In Flight Entertainment in English terminology), intended to offer leisure activities such as films and games during the flight, or the unavailability of the lavatories, particularly in first class, also can find expression in direct monetary compensations and affect the image of the airline company. In addition, such breakdowns can lead to a more or less lasting discontentment on the part of the passengers.

The invention makes it possible to resolve at least one of the problems set forth above.

The invention thus has as an object a method for management of maintenance information items in an aircraft comprising a centralized maintenance system, this method comprising the following steps, receiving at least one maintenance message;

determining the value of an impact attribute associated with the said at least one message received in accordance with predetermined configuration data; and in response to the said at least one message received and to the said value of the said impact attribute associated with the said at least one message received, processing the said at least one message received.

In this way the method according to the invention makes it possible to assist a maintenance operator in the sorting of information items by distinguishing the information items relating to the carrying out of an impending mission of an aircraft from those that do not concern the carrying out of an impending mission of the aircraft. Moreover, this management of priorities generates a significant saving in time for the maintenance operators and/or the mechanics by making it possible in particular to rapidly identify the actions to be taken. The method according to the invention also makes it possible to reduce the risk of delays for the aircraft, since only the essential actions are undertaken during short stopover times.

Advantageously, the method further comprises an initial step of receiving the said configuration data making it possible to prepare them on the ground with the competent participants from the aircraft manufacturer and from the company operating the aircraft.

According to a particular embodiment, the said predetermined configuration data comprise at least one information item relating to at least one predetermined message, an impact attribute value being associated with the said at least one information item relating to the said at least one predetermined message, the said step of determining the said value of the said impact attribute associated with the said at least one message received comprising a step of identifying the said at least one impact attribute value associated with the said at least one information item relating to the said at least one predetermined message, the said at least one information item relating to the said at least one predetermined message being similar to the said information item representative of the said at least one message received. In this way the value of an impact attribute is determined by simple comparison of a parameter relating to a message such as an identifier or an identifier of the functional effects associated with a message.

Advantageously, the said predetermined configuration data comprise at least one combination, the said at least one combination comprising a plurality of information items at least one of which relates to at least one predetermined message, the said step of determining the said value of the said impact attribute comprising the following steps, comparing an information item representative of the said at least one message received with the said at least one information item relating to the said at least one predetermined message; and, in response to the said step of comparing, activation of the said at least one information item relating to the said at least one predetermined message, the said value of the said impact attribute associated with the said at least one message received being determined according to the state of activation of each of the said information items of the said at least one combination.

The value of the impact attribute associated with a message thus can be determined according to messages received beforehand and/or functional effects identified beforehand.

According to a specific embodiment, the said at least one information item relating to at least one predetermined message is adapted for identifying the said at least one predetermined message or for identifying a functional effect, linked to the said at least one predetermined message, on a part of the said aircraft.

The invention also has as an object a method for determination of configuration data for the management of maintenance information items in an aircraft according to the method described above, this determination method comprising the following steps, determining a set of maintenance messages representative of failures and of functional effects associated with the said failures;

assigning an impact attribute value to at least one message of the said set of maintenance messages according to the functional effect associated with the said at least one message;

selecting a plurality of messages in the said set of messages, the said plurality of messages comprising the said at least one message;

modifying the value of an impact attribute of at least one message of the said plurality of messages; and, formatting the said plurality of messages, the said plurality of formatted messages comprising at least one information item representative of at least one message and an associated impact attribute value.

In this way the invention makes it possible to predetermine the values of the impact attributes according to the characteristics of the maintenance messages. Such a determination may be performed in several steps by different participants, in particular by aircraft specialists and by aircraft operation specialists.

According to a particular embodiment, the method further comprises a step of creating a combination of messages and/or functional effects in order to make it possible to define the impact attribute value associated with a message according to messages received beforehand and/or functional effects identified beforehand.

The invention likewise has as an object a computer program comprising instructions adapted for the implementation of each of the steps of the method described above.

The invention also has as an object a device comprising means adapted for the implementation of each of the steps of the method described above, as well as an aircraft comprising such means.

BRIEF DESCRIPTION OF THE DRAWINGS

Other advantages, purposes and characteristics of this invention become apparent from the detailed description that follows, presented by way of non-limitative example, with reference to the attached drawings in which.

DESCRIPTION OF THE PREFERRED EMBODIMENTS

Figure 1:
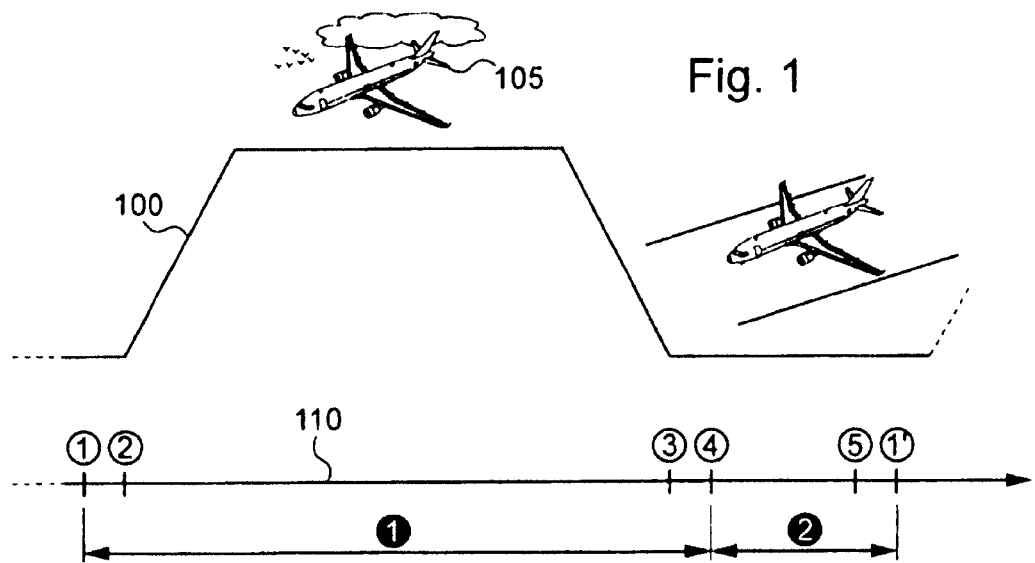
FIG. 1 schematically illustrates the different phases of operation of an aircraft.

The invention applies in particular to determining a level of priority for each information item relating to the breakdowns having impact on the operation of an aircraft. It should be noted first that the relevance of such a mechanism is all the more significant because the volume of maintenance information produced by the new-generation aircraft is constantly increasing.

Nonetheless, the technical problem of identification of breakdowns having an economic impact on the operation of the aircraft is twofold. On the one hand, the usual means for warning the pilot should not be used in order not to disturb him with information items not directly relating to the conduct of the flight. On the other hand, the mechanism should be able to be adapted to the commercial policies of each airline company.

Thus, in accordance with the invention, a mechanism for identification of the information items relating to the breakdowns having a significant economic impact on the operation of an aircraft is implemented in order to allow the airline company operating the aircraft to process them according to their priority. This mechanism is based on a level of priority which can be, for example, an impact or availability attribute associated with each maintenance message.

According to a particular embodiment, the impact attribute can assume two states, a usual state and a state, called HDI (abbreviation for high dispatch impact in English terminology), indicating a fault having a significant economic impact on the operation of the aircraft. The invention, however, also can be implemented with more than two states. In particular, the value of the impact attribute can relate to the importance of the economic impact on the operation of the aircraft.

Such an attribute can be predefined, in particular by the manufacturer of the aircraft or the airline company operating it. The manufacturer preferably defines this attribute for the breakdowns relating to the maintenance systems themselves, while the airline company advantageously defines it for the various breakdowns having effects in the cabin.

Alternatively or complementarily, this attribute can be calculated dynamically in order to take into account, in particular, the cumulative effect of several concomitant breakdowns.

The value of this attribute and/or the rules for dynamic calculation thereof here are stored in memory in a database on board the aircraft, this database being consulted by the centralized maintenance system when it receives a maintenance message.

Specific measures can be taken by the maintenance system in accordance with the value of this attribute in order, in particular, to allow the maintenance crews of the airline company to become aware of the problem and to deal with it according to its priority as a complement to the logbook entries reported by the pilots during the flight. Advantageously, this mechanism does not employ the alarm systems of the aircraft and consequently does not require any special action on the part of the pilots.

In one simple embodiment, the maintenance messages for which the value of the impact attribute is equal to HDI, called HDI messages, are indicated in a distinctive manner in the maintenance report.

During operation of the aircraft, upon receipt of each maintenance message generated by the systems of the aircraft, the centralized maintenance system determines the value of its attribute in an on-board database or, if need be, calculates it dynamically with the aid of predefined rules, preferably according to breakdown messages received beforehand. This value then is stored in memory with the other characteristics of the message in the maintenance report for the flight. Such characteristics are, for example, a failure code, the time of detection of the failure and the codes of correlated messages. The maintenance report for the flight advantageously is presented to the maintenance operator after each mission of the aircraft.

Moreover, the centralized maintenance system makes it possible to perform a sorting of the messages according to the impact attribute in order to select all the HDI messages. Messages can be selected whether or not they form part of a set of messages correlated with each other.

This mechanism for determination of the attribute and for sorting of the messages also preferably applies to messages sent out in response to test operations launched by an operator with the aid of the centralized maintenance system.

In this way, an airline company can expand its maintenance procedures by asking its mechanics to respond to the logbook entries but also to address the breakdowns identified in the maintenance report the impact attribute value of which is equal to HDI.

According to a first variant, in addition to the identification of HDI messages in the maintenance reports and in the test results consulted by the mechanic on board the aircraft, the centralized maintenance system, during the mission, in real time, also transmits the HDI messages to the ground. For these purposes, when the centralized maintenance system receives a maintenance message, it first applies an algorithm for filtering untimely messages, then an algorithm for correlation of the messages with the alarms in order to bring together all the information items relating to the same breakdown. The HDI messages then are identified among the uncorrelated and unfiltered messages. When the impact attribute comprises more than two states, it furthermore is possible to filter the messages according to the value of this attribute, for example in comparison with a threshold which can be predetermined or dynamic.

All the information items likely to have consequences for the carrying out of the next mission are sent in real time, for example by using a communication link of the ACARS (abbreviation for Aircraft Communications Addressing and Reporting System in English terminology) type. These information items here are logbook entries validated by the pilots, the sets of correlated messages containing at least one alarm and the unfiltered HDI messages. All the other maintenance information items are transmitted when the aircraft is on the ground, that is, when more effective and less costly communication methods are available.

In this way, an airline company can expand its maintenance procedures by analyzing the HDI messages received on the ground by specialized technicians brought together, for example, within the maintenance center called MCC (abbreviation for Maintenance Control Center in English terminology). These technicians can consult the complementary information items such as the parameters relating to the next missions, the passenger occupancy rate, the availability of competent personnel and replacement parts at the next stopover in order to confirm or not confirm the request for repair of breakdowns corresponding to the HDI messages and, if need be, to anticipate the maintenance actions, for example by delivery of parts or working out procedures.

Advantageously, the mechanism according to the invention further makes it possible for the technicians in the MCC to create remotely logbook entries covering the requests for repair of the breakdowns corresponding to HDI messages. These entries become added, for example, to those of the pilots during a synchronization of the ground/on-board data when the aircraft is on the ground after having completed its mission.

In this way, the maintenance team can concentrate its work in usual manner on the response to the logbook entries that contain information items relating to breakdowns that can have effects on the safety of the aircraft, the references for which are keyed in by the pilots, and the breakdowns having a significant economic impact on the operation of the aircraft, the references for which are entered remotely by the MCC.

According to another variant, the on-board mechanisms for identification of HDI messages and transmission thereof to the ground in real time are supplemented by a ground system making it possible to aid the technicians in the MCC in making the decision for repair of a breakdown not affecting airplane safety. This system preferably is connected to the airline company centers, for example to the following centers:

operational center for management of missions, in charge in particular of the schedule for the next flights;

commercial center managing the special constraints relating to the comfort of the passengers; and maintenance management center in charge of management of the stocks of replacement parts and the planned maintenance activities.

This system comprises a set of logical rules that allow the airline company to formalize its decision policy. Such rules are, for example, the following:

an IFE breakdown is acceptable in economy class on flights of less than two hours;

an IFE breakdown in first class finds expression in a compensation of a predetermined amount for the passengers occupying the affected seats; and a breakdown of the maintenance system is not acceptable for an airplane that is departing for a mission having more than one stopover without a local station of the airline company.

This system thus can determine a level of recommendation for repair for each HDI message according to the following criteria:

commercial impact with regard to the passengers; and risk of technical delay on the next missions.

When a technician in the MCC has made a decision concerning a repair, the ground system makes it possible to pass the information thereon along to the other networks of the airline company. For example, if it is not possible to repair the IFE in a first-class, the commercial network will be informed of the compensation to be paid to the passenger in the affected seats. Likewise, if a long repair of the maintenance system is to take place, the operational center for operation of the aircraft is informed of the potential delay and can initiate a change of schedule or of aircraft.

FIG. 1 schematically illustrates the different phases of operation of an aircraft. The reference 100 applies to the vertical position of the aircraft 105, characteristic of operation thereof, while the reference 110 represents the time line.

The references ①and ①' indicate the moment at which the pilot agrees to carry out the mission that was entrusted to him, after having verified the functionalities of the aircraft. The references ② and ③ indicate the takeoff and landing, respectively. The reference ④ indicates the end of the mission and the reference ⑤ indicates the time at which the maintenance operations are completed, that is, the time at which all the logbook entries have been addressed.

The reference ❶ applies to the period between the moments ① and ④ during which the aircraft is carrying out a mission, while the reference ❷ applies to the period between the moments ④ and ①', that is, the maintenance period for the aircraft 105. As indicated above, an object of the invention is to reduce the period ❷.

During operation of the aircraft (period ❶), an impact attribute is determined for each maintenance message, for example for each message of BITE (Built-In Test Equipment acronym in English terminology) type. A correlation is determined among the messages received and a filtering of messages is performed. The maintenance messages relating to failures having an impact on the safety of the aircraft as well as the HDI messages advantageously are transmitted in real time to the MCC where they are analyzed in order to allow maintenance organization. The other maintenance messages preferably are transmitted to the MCC between the moments ③ and ④ in order to allow their consideration during the maintenance phase ❷.

In order to perform the maintenance operations (period ❷), the maintenance technicians open the logbook drawn up by the pilot during the mission as well as the documents prepared by the MCC with a view to maintenance. The corresponding maintenance actions then are taken and each logbook entry is addressed.

Figure 2:
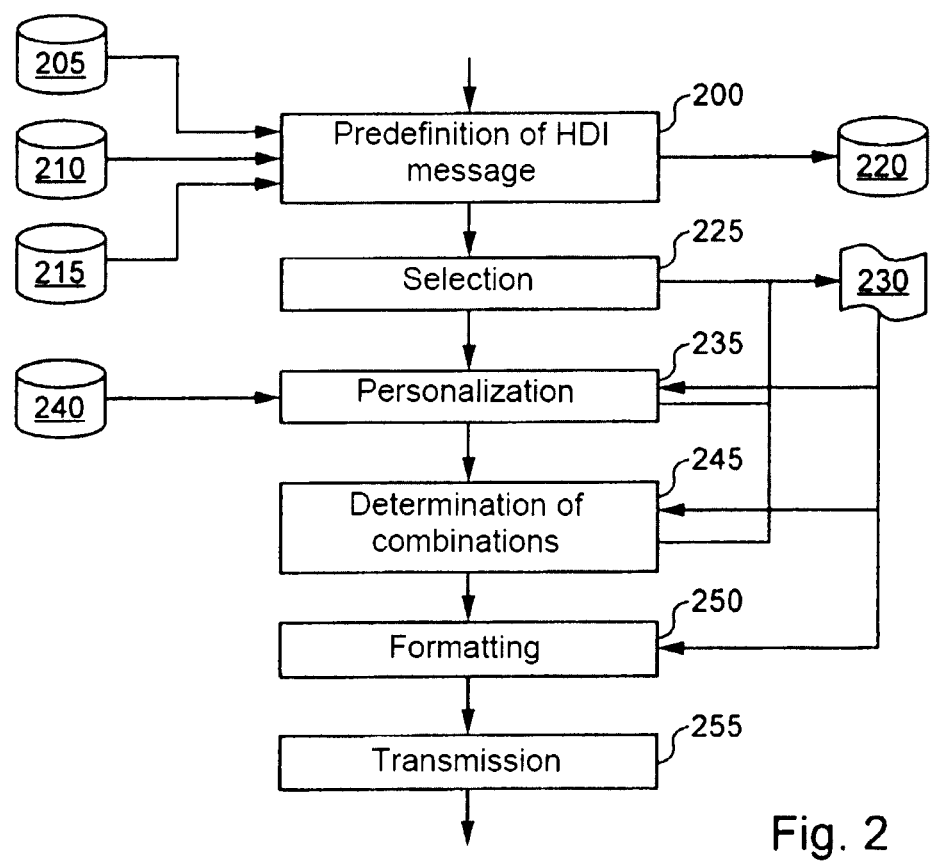
FIG. 2 shows an example of an algorithm that can be used to associate a level of priority with the maintenance messages received.

FIG. 2 shows an example of an algorithm that can be used to associate a level of priority with the maintenance messages, that is, here an impact attribute value. The results of this algorithm are used in the aircraft, in accordance with the invention, in order to determine whether or not a message is to be transmitted to the MCC (in flight or via the logbook).

According to this example, the impact attribute consists of the assignment or non-assignment of the HDI state to each message of BITE type. A first assignment here is made by the manufacturer of the aircraft, this assignment then being supplemented and/or modified by the airline company operating the aircraft.

A first step (step 200) has as an object to define the HDI state of certain messages of BITE type according to the functional effect of the breakdown having brought about the message being considered.

For these purposes, each message of BITE type, defined by the system specialists of the aircraft manufacturer and stored in memory in a database 205, if need be supplemented manually, is analyzed. The analysis consists here in identifying the functional effect of the breakdown having brought about the sending of the message being considered. The functional effects are memorized, for example, in the database 210. They can be characterized by a "severity" that can be obtained with the aid of an automatic link to the tool for generation of the MMEL (abbreviation for Master Minimum Equipment List in English terminology) or manually with regard to the functional effects relating to the maintenance functions.

A set of predetermined rules here stored in memory in the database 215 makes it possible, on the basis of this severity characteristic, to associate or not associate the HDI state with the messages being considered. Such rules are, for example, the following, the impact attribute state of a message is non-HDI for all the messages having functional effects in the cabin (the economic impact cannot be determined by the manufacturer of the aircraft);

the impact attribute state of a message is HDI for all the messages the functional effect of which in the cockpit is not an alarm (in order to allow transmission thereof in flight without a correlated alarm and thus compel processing of these messages by the MCC); and, the impact attribute state of a message is HDI for all the messages having a functional effect of high severity on the maintenance functions.

The messages, or the identifiers of the messages, here are stored in memory in the database 220 with the associated impact attribute value.

When this predefinition step is performed, a selection of the maintenance messages preferably is performed by the specialists of the aircraft manufacturer (step 225). This selection comprises all the HDI messages such as determined in step 200 as well as the messages the economic impact of which, according to the policy of the airline companies, can be deemed significant. In other words, this step is intended to exclude all the messages the economic impact of which never is important, irrespective of the operational context. This step has as an object to reduce the number of messages to be processed by the airline companies and thus to simplify the personalization that can be made by same.

This selection is accomplished by using the information items contained in the database 220, containing in particular the messages selected in step 200, as well as their associated functional effects.

The result of this selection here is stored in memory in file 230, for example in the form of a table where each message identifier is associated with an impact attribute value. This file is transmitted to the airline companies or is made accessible to them. The airline companies have a specific personalization tool in order to access, present and modify the data in this file (step 235). Modification of the impact attributes is possible by a manual selection or by the definition and application of rules linked to the commercial and/or maintenance policy of the airline company here stored in memory in the database 240.

By way of illustration, an airline company can consider a breakdown as having a significant economic impact if it generates a functional effect of moderate severity on the maintenance functions.

Moreover, it is possible to define combinations of maintenance messages and/or functional effects, in particular with regard to the cabin, in order to make it possible to determine the value of the impact attributes dynamically (step 245). These combinations also can be stored in memory in the file 230. These combinations may be determined prior to the personalization step, at the same time as the latter, or after it.

When the personalization has been made by the airline company and, if need be, the combinations of messages and/or functional effects have been determined, the file 230 comprising message data is formatted by a special tool generally called "tools for preparation of airplane loads" (step 250).

The data are formatted, for example, in accordance with ARINC standard 665. The formatted data then are transmitted to the centralized maintenance system of the aircraft as a configuration file (step 255).

Figure 3:
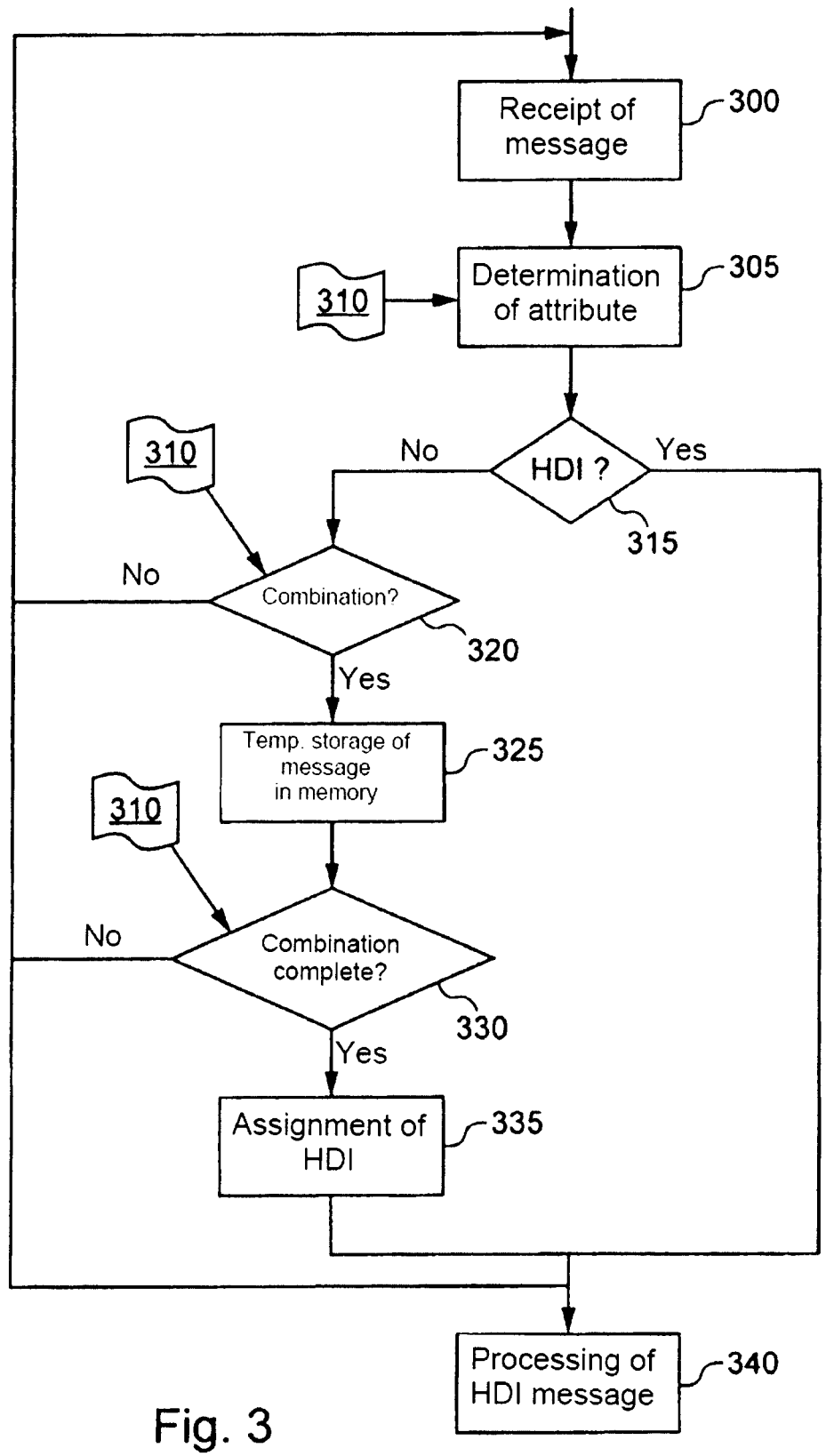
FIG. 3 illustrates an example of an algorithm implemented in the centralized maintenance system of an aircraft in order to manage maintenance information items, in accordance with the invention.

FIG. 3 illustrates an example of an algorithm implemented in the centralized maintenance system of an aircraft in order to manage the maintenance information items, in accordance with the invention.

After having received a message of BITE type (step 300), the system determines the value of the impact attribute to be associated with this message (step 305) by consulting the configuration file 310 stored in memory beforehand in the aircraft. A test then is performed (step 315) in order to determine whether the message received is an HDI message.

If the message received is not an HDI message, another test is performed (step 320) in order to determine whether the message received or the associated functional effect or effects belong to a combination of messages and/or of functional effects that can lead to dynamically associating the HDI state with the message received. This test is performed, for example, by determining whether the message received is identified in the list of combinations contained in the configuration file 310. Alternatively or complementarily, this test can consist in determining whether the functional effect or effects associated with this message belong to the configuration file 310.

If the message received or the associated functional effect or effects do not belong to a combination that can lead to dynamically associating the HDI state with the message received, the latter is ignored and the algorithm continues by returning to step 300 in order to process possible new messages.

If the message received or the associated functional effect or effects belong to a combination that may lead to dynamically associating the HDI state with the message received (step 320), the corresponding datum in the combination is activated. The activation of an element of a combination can consist, for example, in temporarily storing the message received in a buffer memory (step 325) which preferably is erased at the end of each mission. In the same manner, the functional effect or effects associated with the message received can be stored in this buffer memory.

Another test then is performed (step 330) in order to determine whether the combination of messages and/or of functional effects to which the message received or the associated functional effect or effects belongs is complete, that is, whether all its elements are activated. For example, a combination of messages is complete if all the messages belonging to this combination have been received. This test is performed, for example, by comparing the identifiers of the messages stored in the buffer memory with the combinations contained in the configuration file 310.

It should be noted here that the functional effects can be identified independently of the receipt of maintenance messages. These effects preferably then are stored in the buffer memory to be taken into consideration during the test of combinations.

If the combination of messages and/or functional effects to which the message received belongs is not complete, the algorithm continues by returning to step 300 in order to process possible new messages.

On the contrary, if the combination of messages and/or functional effects to which the message received belongs is complete, the HDI state is associated with all the messages of the combination (step 335).

When the message received is an HDI message, identified as HDI or to which the HDI state has been dynamically assigned, the message received, as well as the possible other messages to which the HDI state was assigned during step 335, are processed (step 340).

At the same time, the algorithm continues by returning to step 300 in order to process possible new messages.

As indicated above, processing of the HDI messages consists, in particular, in storing the HDI state in memory with the other characteristics of the message, particularly the code, the time of arrival and the correlated messages in order to allow correlation and filtering of the messages received as well as, if need be, identification of these messages in the maintenance reports and the test results consulted by the mechanic on board the aircraft, transmission of the message to the ground in real time and/or processing of ground decision aid for the technicians of the MCC.

Figure 4:
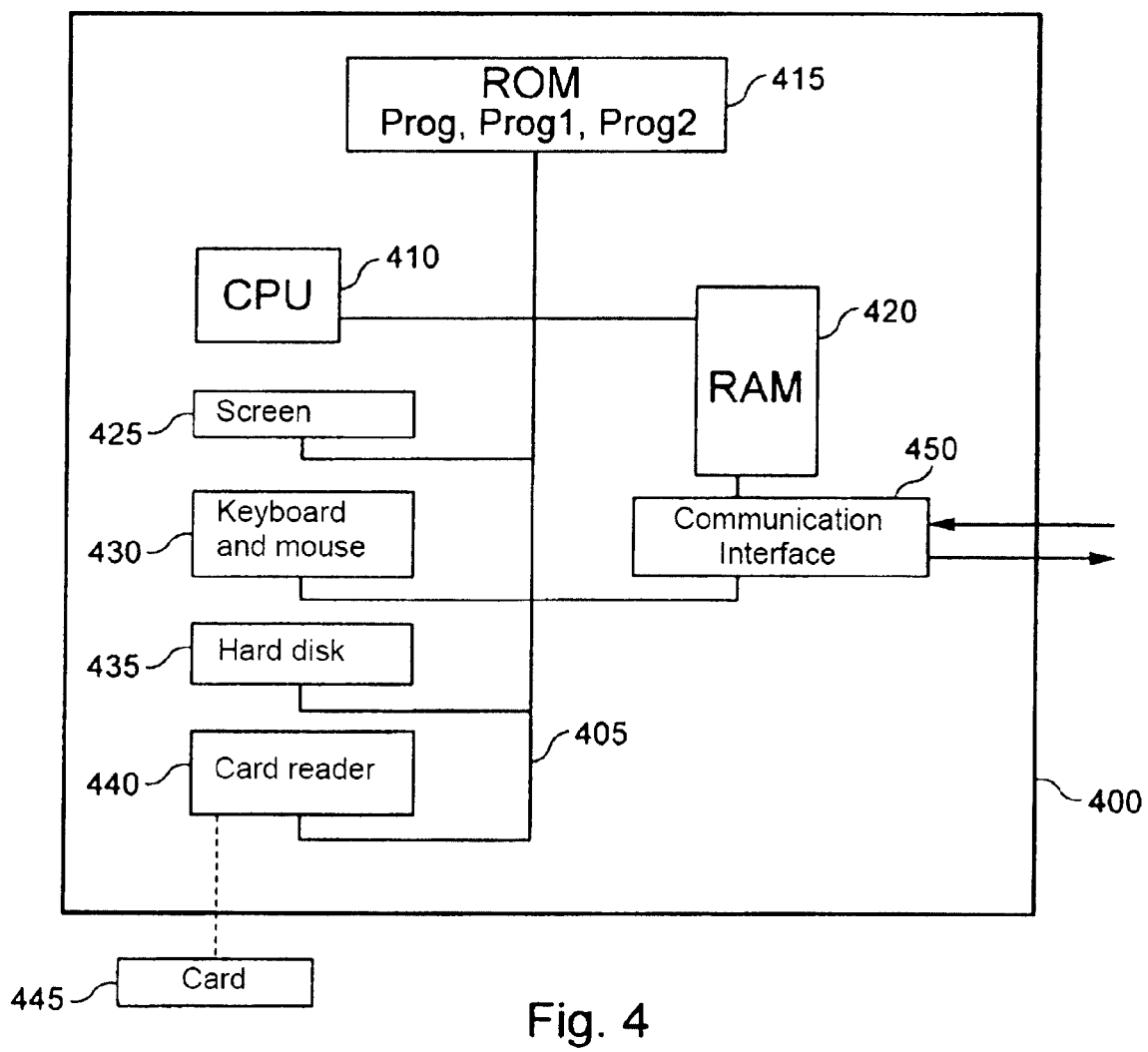
FIG. 4 illustrates an example of physical architecture adapted for implementing the invention, in particular each of the parts of the algorithms shown on FIGS. 2 and 3.

FIG. 4 illustrates an example of physical architecture adapted for implementing the invention, particularly each of the parts of the algorithms shown on FIGS. 2 and 3. The device 400 here comprises a communication bus 405 to which there are connected:
- a central processing unit or microprocessor 410 (CPU, abbreviation for Central Processing Unit in English terminology);
- a read-only memory 415 (ROM, acronym for Read Only Memory in English terminology) that can comprise programs necessary for implementation of the invention;
- a random-access memory or cache memory 420 (RAM, acronym for Random Access Memory in English terminology) comprising registers adapted for recording variables and parameters created ad modified in the course of execution of the aforesaid programs; and
- a communication interface 450 adapted for transmitting and receiving data, particularly to and from the controlled devices of the aircraft in order to monitor them and know their state.

The device 400 preferably also has the following elements:
- a screen 425 making it possible to display data such as representations of commands and able to serve as a graphical interface with the user who will be able to interact with the programs according to the invention, with the aid of a keyboard and a mouse 430 or of another pointing device such as a touch screen or a remote control;
- a hard disk 435 that can comprise the aforesaid programs and data processed or to be processed according to the invention; and
- a memory card reader 440 adapted for receiving a memory card 445 and reading or writing therein data processed or to be processed according to the invention.

The communication bus permits communication and interoperability among the different elements included in the device 400 or connected thereto. The depiction of the bus is not limitative and, in particular, the central unit is capable of communicating instructions to any element of device 400 directly or via another element of device 400.

The executable code of each program permitting the programmable device to implement the processes according to the invention can be stored, for example, on hard disk 435 or in read-only memory 415.

According to one variant, memory card 445 can contain data, in particular a table of correspondence between the detected events and the commands that can be requested, as well as the executable code of the aforesaid programs which, once read by device 400, is stored on hard disk 435.

According to another variant, the executable code of the programs will be able to be received, at least partly, via interface 450, to be stored in a manner identical to that described above.

More generally, it will be possible for the program or programs to be loaded into one of the storage means of device 400 before being executed.

Central unit 410 will control and direct the execution of the instructions or portions of software code of the program or programs according to the invention, which instructions are stored on hard disk 435 or in read-only memory 415 or else in the other aforesaid storage elements. During boot-up, the program or programs that are stored in a non-volatile memory, for example hard disk 435 or read-only memory 415, are transferred to random-access memory 420 which then contains the executable code of the program or programs according to the invention, as well as the registers for storing in memory the variables and parameters necessary for implementation of the invention.

Naturally, to satisfy specific needs, an individual competent in the field of the invention will be able to apply modifications in the foregoing description.

The invention claimed is:

1. A method for management of maintenance information items in an aircraft comprising a centralized maintenance system, the method comprising:
    receiving at least one maintenance message concerning a fault in the aircraft that does not have an impact on flight safety of the aircraft;
    determining a value of an impact attribute associated with the at least one maintenance message according to predetermined configuration data, the value of the impact attribute corresponding to a level of an importance of an economic impact on operation of the aircraft that results if the fault is not corrected and based on a commercial impact with regard to the passengers and a risk of technical delay on subsequent missions;
    assigning a priority to the at least one maintenance message based on the value of the impact attribute associated with the at least one maintenance message; and processing the at least one maintenance message according to the assigned priority based on the value of the impact attribute associated with the at least one maintenance message.

2. The method according to claim 1, further comprising an initial step of receiving the predetermined configuration data.

3. The method according to claim 1, wherein the predetermined configuration data comprise at least one information item relating to at least one predetermined message, and an impact attribute value associated with the at least one information item relating to the at least one predetermined message, and
    the determining the value of the impact attribute associated with the at least one maintenance message further comprises:
    identifying the at least one impact attribute value associated with the at least one information item relating to the at least one predetermined message, the at least one information item relating to the at least one predetermined message being similar to the information item representative of the at least one maintenance message.

4. The method according to claim 1, wherein the predetermined configuration data comprise at least one combination having a plurality of information items at least one of which relates to at least one predetermined message, and the determining the value of the impact attribute further comprises:
    comparing an information item representative of the at least one maintenance message with the at least one information item relating to the at least one predetermined message; and
    in response to the comparing, activating the at least one information item relating to the at least one predetermined message,
    the value of the impact attribute associated with the at least one maintenance message is determined according to an activation state of each of the information items of the at least one combination.

5. The method according to claim 3, wherein the at least one information item relating to the at least one predetermined message identifies the at least one predetermined message or identifies at least one functional effect, linked to the at least one predetermined message, on a part of the aircraft.

6. The method according to claim 4, wherein the at least one information item relating to the at least one predetermined message identifies the at least one predetermined message or identifies at least one functional effect, linked to the at least one predetermined message, on a part of the aircraft.

7. The method according to claim 1, further comprising:
    determining different values of the impact attribute based on whether a failure effects economy class passengers or first class passengers.

8. The method according to claim 1, further comprising:
    determining the value of the impact attribute based on a duration of an impact the fault will have on passengers.

9. The method according to claim 1, further comprising:
    determining the value of the impact attribute based on a number of planned stopovers without a local station of the airline company.

10. A method for determination of configuration data for the management of maintenance information items in an aircraft according to the method of claim 1, and further comprising:
    determining a set of maintenance messages representative of failures and of functional effects associated with the failures;
    assigning an impact attribute value to at least one message of the set of maintenance messages according to the functional effect associated with the at least one message;
    selecting a plurality of messages in the set of messages, the plurality of messages comprising the at least one message;
    modifying a value of an impact attribute of the at least one message of the plurality of messages; and
    formatting the plurality of messages, the plurality of formatted messages comprising at least one information item representative of the at least one message and the associated modified impact attribute value.

11. The method according to claim 10, further comprising: creating a combination of messages or of functional effects.

12. A method for determination of configuration data for the management of maintenance information items in an aircraft according to the method of claim 3, and further comprising:
    determining a set of maintenance messages representative of failures and of functional effects associated with the failures;
    assigning an impact attribute value to at least one message of the set of maintenance messages according to the functional effect associated with the at least one message;

selecting a plurality of messages in the set of messages, the plurality of messages comprising the at least one message;

modifying a value of an impact attribute of the at least one message of the plurality of messages; and formatting the plurality of messages, the plurality of formatted messages comprising at least one information item representative of the at least one message and the associated modified impact attribute value.

13. The method according to claim 12, further comprising: creating a combination of messages or of functional effects.

14. A method for determination of configuration data for the management of maintenance information items in an aircraft according to the method of claim 4, and further comprising:

determining a set of maintenance messages representative of failures and of functional effects associated with the failures;

assigning an impact attribute value to at least one message of the set of maintenance messages according to the functional effect associated with the at least one message;

selecting a plurality of messages in the said set of messages, the plurality of messages comprising the at least one message;

modifying a value of an impact attribute of the at least one message of the plurality of messages; and formatting the plurality of messages, the plurality of formatted messages comprising at least one information item representative of the at least one message and the associated modified impact attribute value.

15. The method according to claim 14, further comprising: creating a combination of messages or of functional effects.

16. A tangible, non-transitory, computer readable medium storing a program comprising instructions which, when executed by a computer, cause the computer to perform a method for management of maintenance information items in an aircraft comprising a centralized maintenance system, the method comprising:

receiving at least one maintenance message concerning a fault in the aircraft that does not have an impact on flight safety of the aircraft;

determining a value of an impact attribute associated with the at least one maintenance message according to predetermined configuration data, the value of the impact attribute corresponding to a level of an importance of an economic impact on operation of the aircraft that results if the fault is not corrected and based on a commercial impact with regard to the passengers and a risk of technical delay on subsequent missions;

assigning a priority to the at least one maintenance message based on the value of the impact attribute associated with the at least one maintenance message; and processing the at least one maintenance message according to the assigned priority based on the value of the impact attribute associated with the at least one maintenance message.

17. A device for management of maintenance information items in an aircraft comprising a centralized maintenance system, the device comprising:

circuitry configured to:

receive at least one maintenance message concerning a fault in the aircraft that does not have an impact on flight safety of the aircraft;

determine a value of an impact attribute associated with the at least one maintenance message according to predetermined configuration data, the value of the impact attribute corresponding to a level of an importance of an economic impact on operation of the aircraft that results if the fault is not corrected and based on a commercial impact with regard to the passengers and a risk of technical delay on subsequent missions;

assign a priority to the at least one maintenance message based on the value of the impact attribute associated with the at least one maintenance message; and process the at least one maintenance message according to the assigned priority based on the value of the impact attribute associated with the at least one maintenance message.

18. An aircraft including a centralized maintenance system for management of maintenance information items in the aircraft, the aircraft further comprising:

circuitry configured to:

receive at least one maintenance message concerning a fault in the aircraft that does not have an impact on flight safety of the aircraft;

determine a value of an impact attribute associated with the at least one maintenance message according to predetermined configuration data, the value of the impact attribute corresponding to a level of an importance of an economic impact on operation of the aircraft that results if the fault is not corrected and based on a commercial impact with regard to the passengers and a risk of technical delay on subsequent missions;

assign a priority to the at least one maintenance message based on the value of the impact attribute associated with the at least one maintenance message; and process the at least one maintenance message according to the assigned priority based on the value of the impact attribute associated with the at least one maintenance message.

* * * * *